United States Patent
Lin et al.

(10) Patent No.: US 9,256,022 B2
(45) Date of Patent: Feb. 9, 2016

(54) LIGHT-DIRECTING DEVICE

(71) Applicant: Radiant Opto-Electronics Corporation, Kaohsiung (TW)

(72) Inventors: Wei-Chen Lin, Kaohsiung (TW); Hui-Ching Hsueh, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 272 days.

(21) Appl. No.: 14/137,495

(22) Filed: Dec. 20, 2013

(65) Prior Publication Data

US 2014/0334180 A1    Nov. 13, 2014

(30) Foreign Application Priority Data

May 7, 2013   (TW) .............................. 102116219 A

(51) Int. Cl.
*F21V 8/00*   (2006.01)

(52) U.S. Cl.
CPC ............ *G02B 6/0055* (2013.01); *G02B 6/0045* (2013.01); *G02B 6/0053* (2013.01); *G02B 6/0091* (2013.01)

(58) Field of Classification Search
CPC .. G02B 6/0055; G02B 6/0045; G02B 6/0053; G02B 6/0091
See application file for complete search history.

(56) References Cited

U.S. PATENT DOCUMENTS

| 4,648,690 | A | * | 3/1987 | Ohe | G02B 6/0055 362/23.15 |
| 5,390,276 | A | * | 2/1995 | Tai | G02B 6/0036 362/561 |
| 6,880,946 | B2 | * | 4/2005 | Mullen | G02B 6/0046 362/23.15 |
| 2004/0042233 | A1 | | 3/2004 | Suzuki et al. | |
| 2005/0140849 | A1 | * | 6/2005 | Hoelen | G02B 6/0046 349/65 |
| 2009/0213569 | A1 | | 8/2009 | Kim et al. | |
| 2012/0092591 | A1 | | 4/2012 | Zheng et al. | |

FOREIGN PATENT DOCUMENTS

| CN | 1492269 A | 4/2004 |
| CN | 101514789 A | 8/2009 |
| CN | 201867506 U | 6/2011 |
| CN | 202101159 U | 1/2012 |
| TW | 201239268 A | 10/2012 |

OTHER PUBLICATIONS

Office Action for Taiwanese Application No. 102116219 dated Sep. 12, 2014.

* cited by examiner

*Primary Examiner* — David V Bruce
(74) *Attorney, Agent, or Firm* — Alston & Bird LLP

(57) ABSTRACT

A light-directing device adapted for directing light emitted by a light source. The light-directing device includes a light-guiding plate and a directing unit that is disposed adjacent to the light-guiding plate such that a portion of the light emitted by the light source into the light-guiding plate is internally reflected by a first inclined surface thereof to exit the light-guiding plate toward an illuminating region, and another portion of the light emitted by the light source passes through the light-guiding plate, enters the directing unit and is internally reflected by a second inclined surface thereof to exit the directing unit toward the illuminating region.

20 Claims, 5 Drawing Sheets

LIGHT-DIRECTING DEVICE

CROSS-REFERENCE TO RELATED APPLICATION

This application claims priority of Taiwanese Patent Application No. 102116219, filed on May 7, 2013.

BACKGROUND OF THE INVENTION

1. Field of the Invention

The invention relates to an optical element, more particularly to a light-directing device adapted for directing light emitted by a light source.

2. Description of the Related Art

Referring to FIG. 1, a conventional illuminating device 1 includes a light source 11, and a light-guiding plate 12 for guiding light emitted by the light source 11. The light-guiding plate 12 has a light-receiving surface 121 facing the light source 11, and an inclined surface 122. A portion of the light emitted by the light source 11 is reflected by the inclined surface 122 to exit the light-guiding plate 12 via a light-exit surface 123 by virtue of internal reflection. The remaining portion of the light exits the light-guiding plate 12 via the inclined surface 122.

While a reflector (not shown) can be placed at the inclined surface 122 in order to increase the rate of reflection occurred at the inclined surface 122 toward the light-exit surface 123, the overall optical efficiency of the conventional illuminating device 1 is still low.

SUMMARY OF THE INVENTION

Therefore, the object of the present invention is to provide a light-directing device that can eliminate the aforesaid drawbacks of the prior art.

According to the present invention, there is provided a light-directing device adapted for directing light emitted by a light source. The light-directing device includes a light-guiding plate and a directing unit that is disposed adjacent to the light-guiding plate such that a portion of light emitted by the light source into the light-guiding plate is internally reflected to exit the light-guiding plate toward an illuminating region, and another portion of the light emitted by the light source passes through the light-guiding plate, enters the directing unit and is internally reflected to exit the directing unit toward the illuminating region.

The effect of the present invention is that, by enabling at least twice the internal reflection of the light while simultaneously turning the light toward the same direction, the amount of light directed is effectively increased and the overall optical efficiency of the light-directing device is enhanced; and by the provision of the directing unit, the machining precision and manufacturing cost of the light-guiding plate is reduced.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
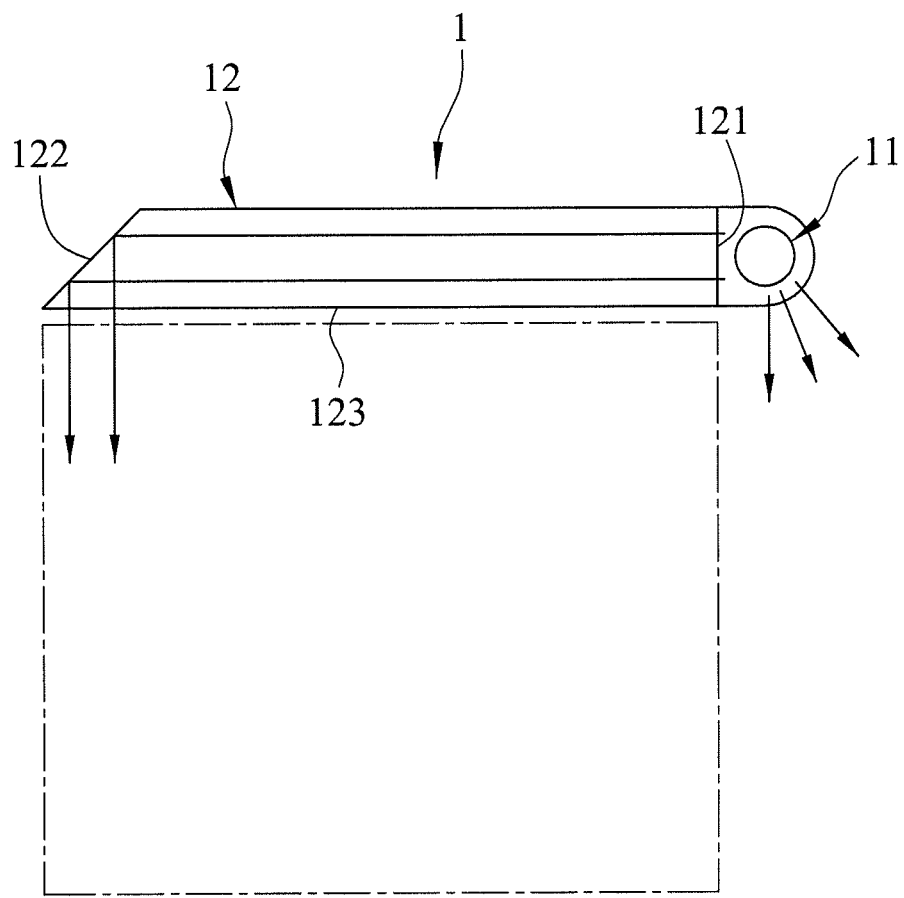
FIG. 1 is a side view of a conventional illuminating device.

Before the present invention is described in greater detail, it should be noted that like elements are denoted by the same reference numerals throughout the disclosure.

Figure 2:
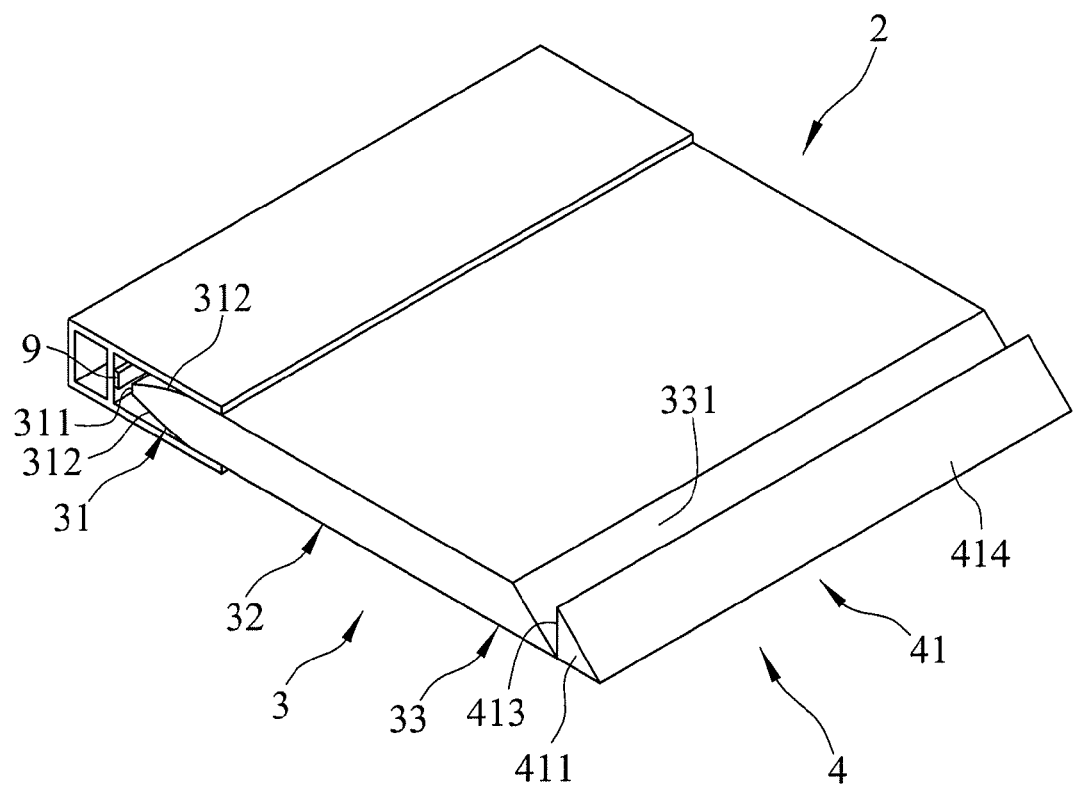
FIG. 2 is a perspective view of the first preferred embodiment of a light-directing device according to the present invention.
Figure 3:
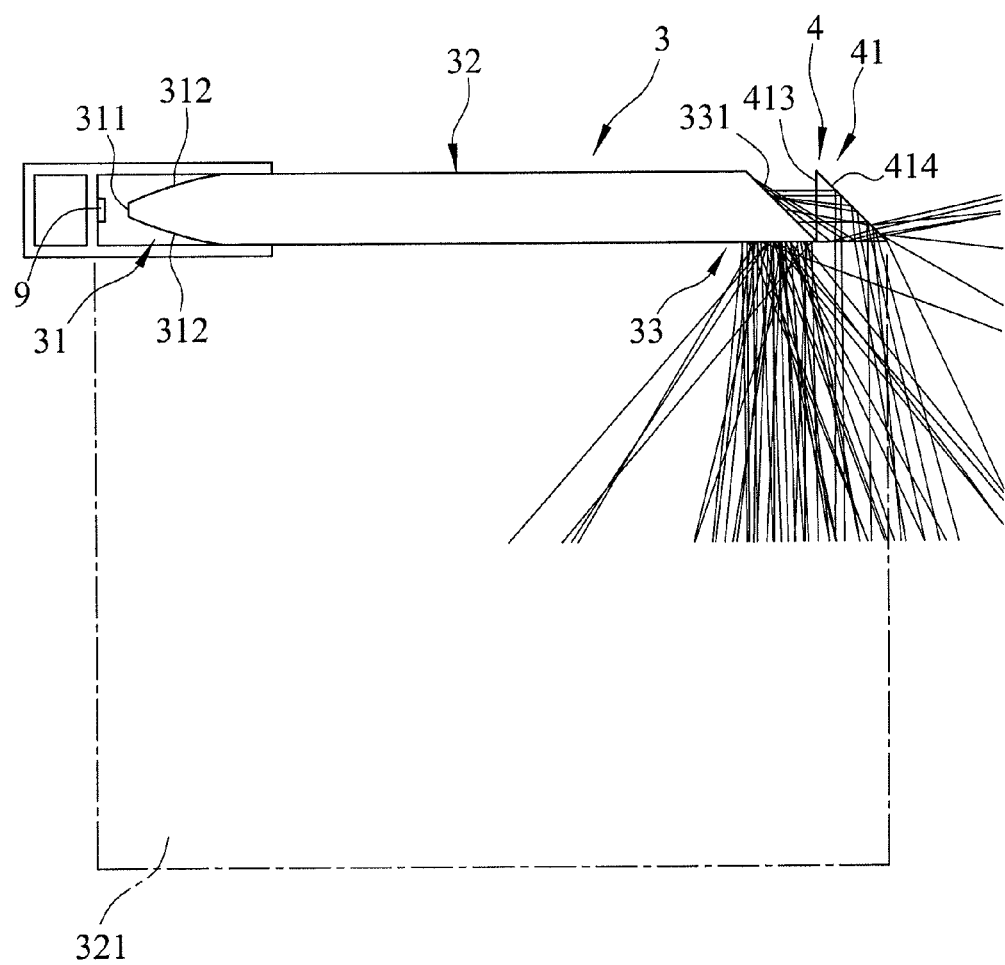
FIG. 3 is a side view of the first preferred embodiment.

Referring to FIGS. 2 and 3, the first preferred embodiment of a light-directing device 2 according to the present invention is adapted for directing light emitted by a light source 9. The light-directing device 2 includes a light-guiding plate 3 and a directing unit 4. The light-guiding plate 3 includes a collimating section 31 that is adjacent to the light source 9 and that receives and collimates the light emitted by the light source 9, a guiding section 32 that is connected to the collimating section 31, and a directing section 33 that is connected to the guiding section 32, that is opposite to the collimating section 31 and that has a first inclined surface 331. The collimating section 31 converges from the guiding section 32 toward the light source 9, and has a flat entering surface 311 facing the light source 9 for passage of the light emitted by the light source 9 therethrough into the light-guiding plate 3, and two parabolic connecting surfaces 312 respectively extending from opposite sides of the entering surface 311 and connected to the guiding section 32.

The directing unit 4 is disposed adjacent to the light-guiding plate 3 and has at least one directing member 41 that has a main body 411. In this embodiment, the directing unit 4 includes the directing member 41 that is a triangular prism. The main body 411 has a light-receiving surface 413 facing the first inclined surface 331 of the light-guiding plate 3, and a second inclined surface 414 opposite to the light-receiving surface 413 and the first inclined surface 331. In this embodiment, the second inclined surface 414 is parallel to the first inclined surface 331 and is not limited hereto.

Since the collimating section 31 converges from the guiding section 32 toward the light source 9 and has two parabolic connecting surfaces 312, once the light emitted by the light source 9 enters the entering surface 311 into the light-guiding plate 3, the connecting surfaces 312 help directing the light in a way such that a majority of the light travels in a substantially straight manner toward the directing unit 4 into the directing section 33, and is internally reflected thereby to exit the light-guiding plate 3 toward an illuminating region 321. Another portion of the light reaching the first inclined surface 331 passes through the first inclined surface 331 to exit the light-guiding plate 3, enters the directing member 41 via the light-receiving surface 413 and is internally reflected by the second inclined surface 414 to exit the directing unit 4 toward the illuminating region 321.

As shown in FIG. 3, a majority of the light emitted by the light source is internally reflected in the directing section 33 toward the illuminating region 321, while a minority passes through the directing section 33 and is reflected by the directing unit 4 toward the illuminating region 321.

It should be noted that the slopes of the first inclined surface 331 of the directing section 33 and the second inclined surface 414 of the main body 411 are configured such that internal reflection is achieved and that light is reflected by the first and second inclined surfaces 331, 414 in reflecting angles smaller than 180 degrees. Simultaneously, the first and second inclined surfaces 331, 414 direct the light to exit the light-directing device 2 toward the same illuminating region 321 (i.e., toward the third and/or fourth quadrant of FIG. 3 in this embodiment).

With the provision of the directing unit 4, the portion of the light that passes through the first inclined surface 331 and not reflected thereby has a second chance of being reflected toward the illuminating region 321 at the second inclined surface 414, thereby enhancing the overall optical efficiency of the light-directing device 2.

Figure 4:
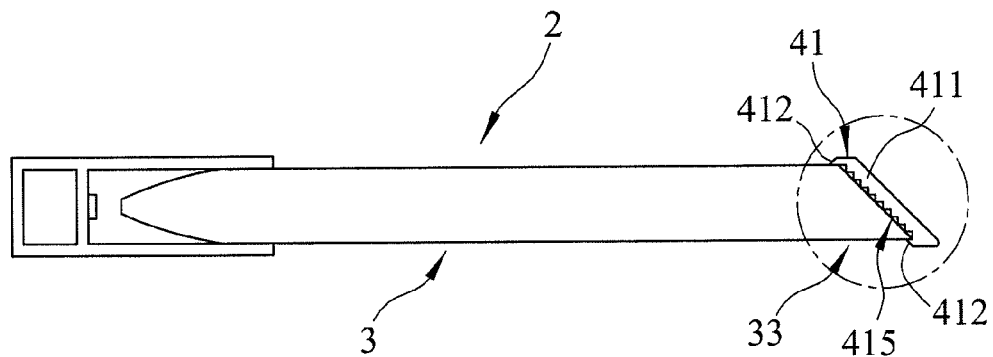
FIG. 4 is a side view of the second preferred embodiment of a light-directing device according to the present invention.
Figure 5:
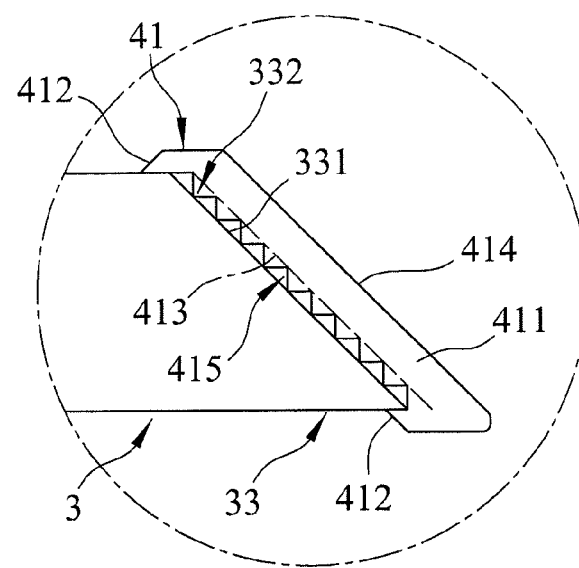
FIG. 5 is a partially enlarged view of the second preferred embodiment, for illustrating a microstructure.

Referring to FIGS. 4 and 5, the second preferred embodiment of a light-directing device 2 according to the present invention is similar to the first preferred embodiment in structure. The second preferred embodiment differs from the first preferred embodiment in the configuration of the directing member 41. In this embodiment, the light-receiving surface 413 of the directing member 41 is parallel to the first inclined surface 331 of the light-guiding plate 3, and the directing member 41 further has two clamping bodies 412 extending from the main body 411 and clamping fixedly the light-guiding plate 3 therebetween, and a microstructure 415 formed on the light-receiving surface 413 for enhancing the light-reflecting effect. The directing member 41 clamps onto the reflective section 33 of the light-guiding plate 3 through the clamping bodies 412. In this embodiment, the light-receiving surface 413 of the directing member 41 and the first inclined surface 331 of the light-guiding plate 3 are inclined surfaces, and the microstructure 415 consists of a plurality of continuous V-shaped cut structures, but is not limited to what is disclosed herein.

This way, the second preferred embodiment not only achieves the same effect as the first preferred embodiment but through the microstructure 415, also has a further enhanced optical efficiency.

Figure 6:
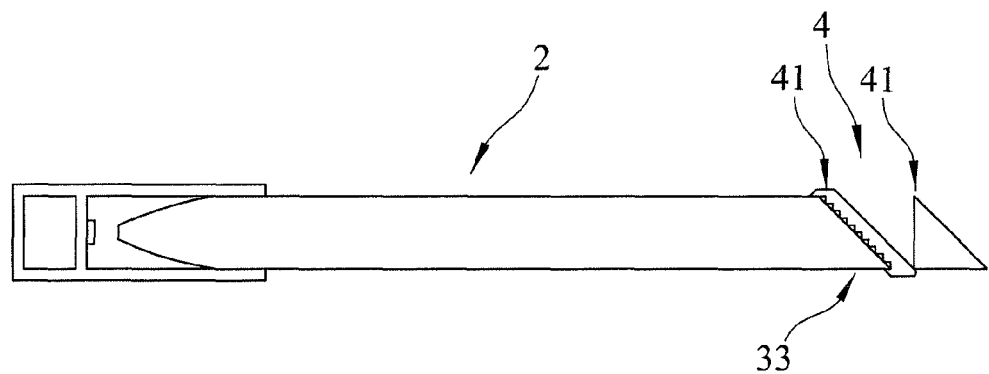
FIG. 6 is a side view of the third preferred embodiment of a light-directing device according to the present invention.
Figure 7:
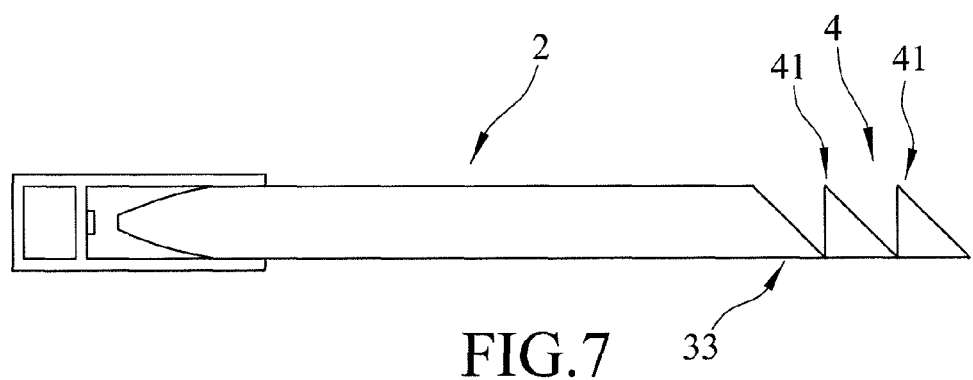
FIGS. 7 and 8 are side views of the third preferred embodiment, for illustrating possible combinations of the directing units.
Figure 8:
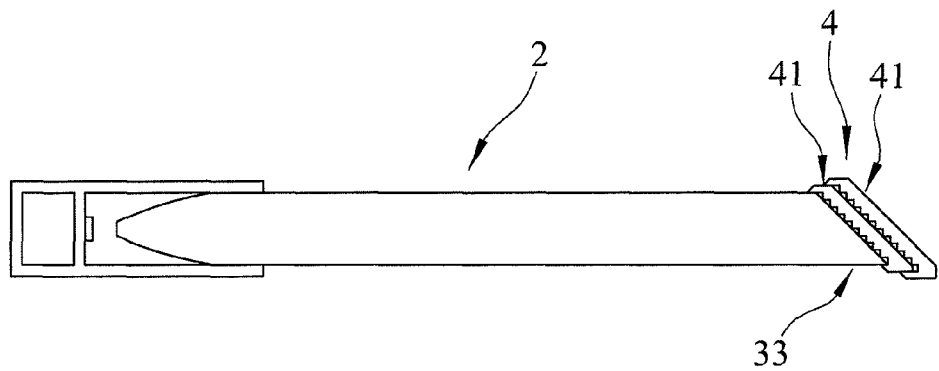

With reference to FIGS. 6, 7 and 8, the third preferred embodiment of a light-directing device 2 according to the present invention is similar to the first preferred embodiment in structure and differs in that the directing unit 4 has two directing members 41. The directing members 41 can be two different types of directing members 41 (as shown in FIG. 6), or the same type of directing members 41 (as shown in FIGS. 7 and 8).

With this design, by increasing the number of directing members 41, the effectiveness of directing the light toward the illuminating region 321 is also increased. When compared to the prior art, the present invention allows other portions of light that were not initially reflected by the first inclined surface 331 of the directing section 33 to be reflected by the directing member(s) 41, thereby increasing the amount of light directed to the illuminating region 321.

In addition, with the provision of the directing unit 4, the precision requirement of fabricating the light-guiding plate 3 may be lowered, thereby decreasing manufacturing costs and complexity.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A light-directing device adapted for directing light emitted by a light source, said light-directing device comprising:
   a light-guiding plate; and
   a directing unit that is disposed adjacent to said light-guiding plate;
   wherein a portion of the light emitted by the light source into said light-guiding plate is internally reflected to exit said light-guiding plate toward an illuminating region; and
   wherein another portion of the light emitted by the light source passes through said light-guiding plate, enters said directing unit and is internally reflected to exit said directing unit toward the illuminating region.

2. The light-directing device as claimed in claim 1, wherein:
   said light-guiding plate has a first inclined surface; and
   said directing unit has at least one directing member that has a light-receiving surface facing said first inclined surface of said light-guiding plate, and a second inclined surface opposite to said light-receiving surface, the portion of the light emitted by the light source into said light-guiding plate is internally reflected by said first inclined surface to exit said light-guiding plate toward the illuminating region, the another portion of the light emitted by the light source passing through said light-guiding plate via said first inclined surface, entering said directing member via said light-receiving surface and being internally reflected by said second inclined surface to exit said directing unit toward the illuminating region.

3. The light-directing device as claimed in claim 2, wherein said directing member of said directing unit has:
   a main body having said second inclined surface; and
   two clamping bodies extending from said main body and clamping fixedly said light-guiding plate therebetween.

4. The light-directing device as claimed in claim 3, wherein said main body of said directing member further has a microstructure formed on said light-receiving surface.

5. The light-directing device as claimed in claim 3, wherein:
   said light-guiding plate includes a collimating section that receives and collimates the light emitted by the light source, a guiding section that is connected to said collimating section, and a directing section that is connected to said guiding section and that has said first inclined surface.

6. The light-directing device as claimed in claim 5, wherein:
   said collimating section converges from said guiding section toward the light source, and has an entering surface facing the light source for passage of the light emitted from the light source therethrough into said light-guiding plate, and two parabolic connecting surfaces respectively extending from opposite sides of said entering surface and connected to said guiding section.

7. The light-directing device as claimed in claim 2, wherein the light is reflected by said first and second inclined surfaces in reflecting angles smaller than 180 degrees.

8. A light-directing device adapted for directing light emitted by a light source, said light-directing device comprising:
   a light-guiding plate having a first surface that is configured to allow a portion of the light emitted by the light source to be internally reflected to exit said light-guiding plate toward an illuminating region, another portion of the light emitted by the light source passing through said first surface; and
   a directing unit disposed adjacent to said light-guiding plate, said directing unit having at least one directing member that has a second surface, said second surface being configured to internally reflect another portion of the light after passing through said first surface to exit said light-guiding plate toward the illuminating region.

9. The light-directing device as claimed in claim 8, wherein said first and second surfaces are inclined.

10. The light-directing device as claimed in claim 8, wherein said directing member of said directing unit has:
a main body having said second surface; and
two clamping bodies extending from said main body and clamping fixedly said light-guiding plate therebetween.

11. The light-directing device as claimed in claim 10, wherein said main body of said directing member further has a light-receiving surface facing said first surface of said light-guiding plate, and a microstructure formed on said light-receiving surface.

12. The light-directing device as claimed in claim 8, wherein:
said light-guiding plate includes a collimating section that receives and collimates the light emitted by the light source, a guiding section that is connected to said collimating section, and a directing section that is connected to said guiding section and that has said first surface.

13. The light-directing device as claimed in claim 12, wherein:
said collimating section converges from said guiding section toward the light source, and has an entering surface facing the light source for passage of the light emitted from the light source therethrough into said light-guiding plate, and two parabolic connecting surfaces respectively extending from opposite sides of said entering surface and connected to said guiding section.

14. The light-directing device as claimed in claim 8, wherein the light is reflected by said first and second surfaces in reflecting angles smaller than 180 degrees.

15. A light-directing device adapted for directing light emitted by a light source, said light-directing device comprising:
a light-guiding plate including a directing section opposite to an end adjacent to the light source, a majority of the light emitted by the light source being internally reflected in the directing section toward an illuminating region; and
a directing unit disposed adjacent to the directing section of said light-guiding plate, a minority of the light emitted by the light source passing through the directing section and being internally reflected by said directing unit toward the illuminating region.

16. The light-directing device as claimed in claim 15, wherein:
said light-guiding plate has a first inclined surface formed in the directing section; and
said directing unit has at least one directing member that has a light-receiving surface facing said first inclined surface of said light-guiding plate, and a second inclined surface opposite to said light-receiving surface, the portion of the light emitted by the light source into said light-guiding plate is internally reflected by said first inclined surface to exit said light-guiding plate toward the illuminating region, the another portion of the light emitted by the light source passing through said light-guiding plate via said first inclined surface, entering said directing member via said light-receiving surface and being internally reflected by said second inclined surface to exit said directing unit toward the illuminating region.

17. The light-directing device as claimed in claim 16, wherein said directing member of said directing unit has:
a main body having said second inclined surface; and
two clamping bodies extending from said main body and clamping fixedly said light-guiding plate therebetween.

18. The light-directing device as claimed in claim 17, wherein said main body of said directing member further has a microstructure formed on said light-receiving surface.

19. The light-directing device as claimed in claim 15, wherein:
said light-guiding plate includes a collimating section that receives and collimates the light emitted by the light source, and a guiding section that is connected between said collimating section and said directing section.

20. The light-directing device as claimed in claim 19, wherein:
said collimating section converges from said guiding section toward the light source, and has an entering surface facing the light source for passage of the light emitted from the light source therethrough into said light-guiding plate, and two parabolic connecting surfaces respectively extending from opposite sides of said entering surface and connected to said guiding section.

\* \* \* \* \*